June 27, 1961 J. M. GOLDEN 2,990,204
SWIVEL JOINTS FOR ELECTRIC FIXTURES
Filed Nov. 17, 1958 2 Sheets-Sheet 1
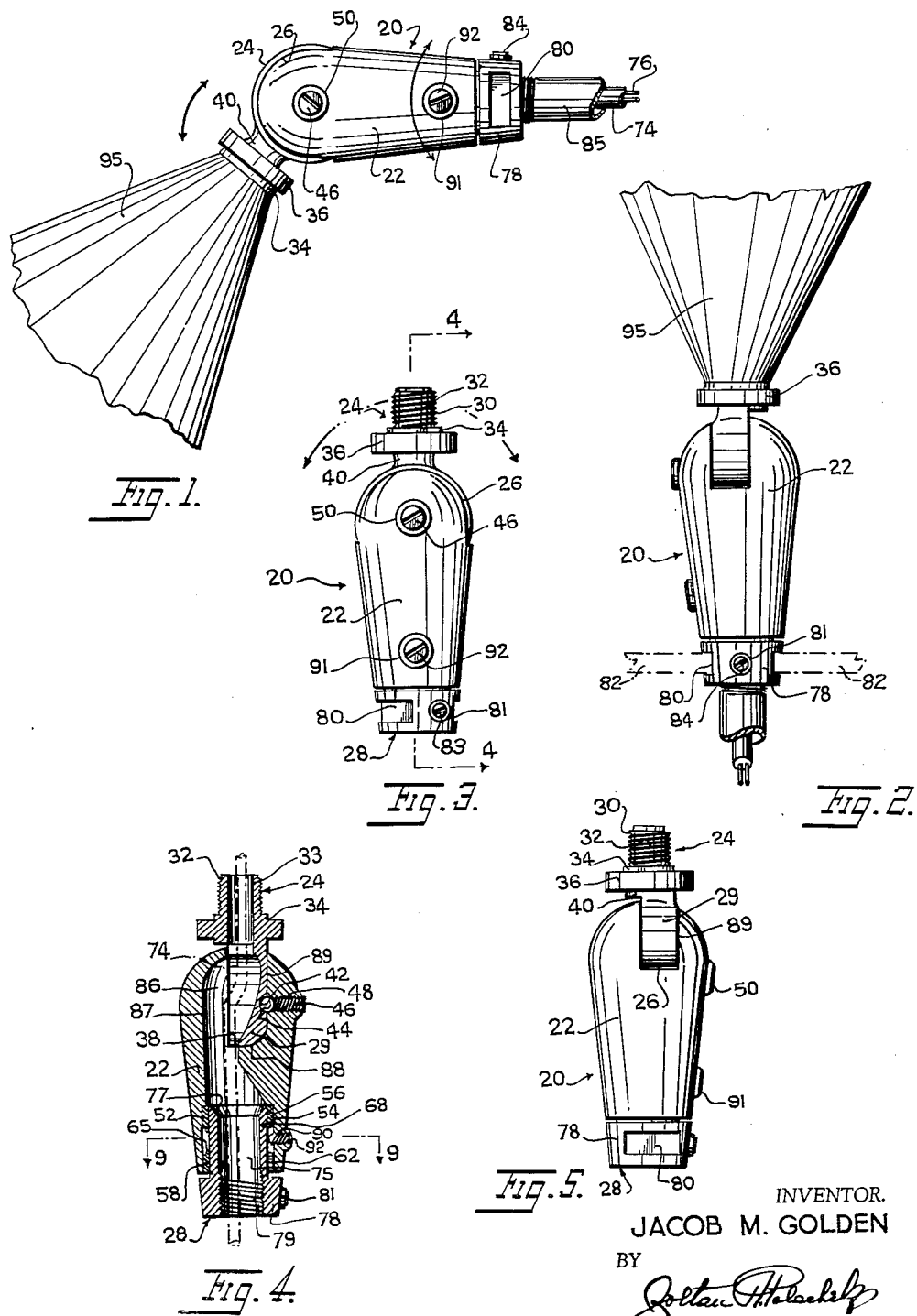
INVENTOR.
JACOB M. GOLDEN
BY
*ATTORNEY*

June 27, 1961  J. M. GOLDEN  2,990,204
SWIVEL JOINTS FOR ELECTRIC FIXTURES
Filed Nov. 17, 1958                    2 Sheets-Sheet 2
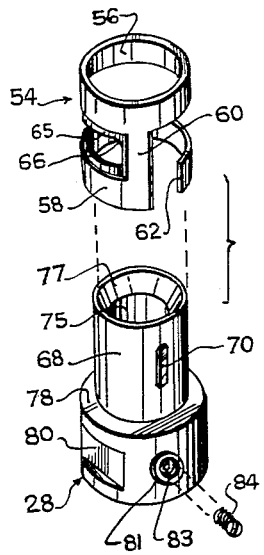
Fig. 6.
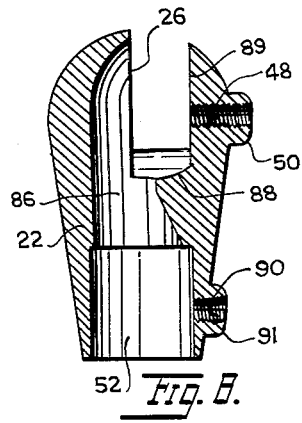
Fig. 8.
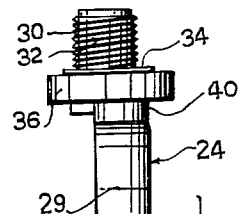
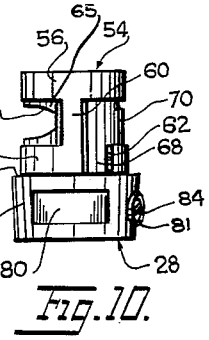
Fig. 10.
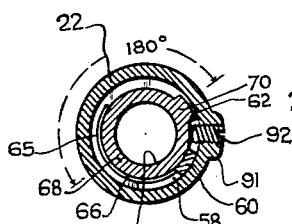
Fig. 9.
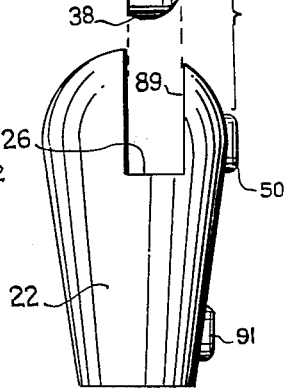
Fig. 7.
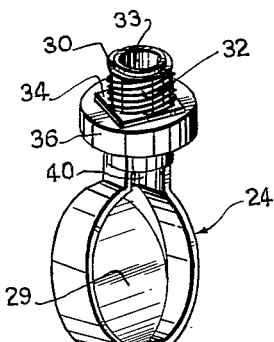
Fig. 11.
INVENTOR.
JACOB M. GOLDEN
BY
*Zoltan Holocsek*
ATTORNEY

United States Patent Office 2,990,204
Patented June 27, 1961

2,990,204
SWIVEL JOINTS FOR ELECTRIC FIXTURES
Jacob M. Golden, 484 Linden Blvd., Brooklyn, N.Y.
Filed Nov. 17, 1958, Ser. No. 774,274
5 Claims. (Cl. 287—91)

This invention relates to the art of swivel joints for electrical fixtures and particularly concerns a novel structure for accomplishing movement of a supported fixture on two mutually perpendicular axes.

A principal object of the invention is to provide a fitting permitting angular movement of a fixture through angles of substantially 180° in two mutually perpendicular planes.

It is a further object to provide a swivel joint fitting which permits a rotatable fixture to be limited in rotation to an angle of about 180° with respect to a support so that electric wires passing through the fitting are prevented from excessive twisting.

It is a still further object to provide a swivel joint fitting for a rotatable fixture in which angular rotation of the fixture is limited by cam elements in the fitting to a predetermined angle so that wires passing through the fitting are prevented from excessive twisting.

It is a still further object to provide a swivel joint fitting of simplified structure which has a lesser number of parts and which is adapted to economical mass production manufacturing methods.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an elevational view of the swivel joint fitting embodying the invention, with portions of a lamp fixture and support connected thereto.

FIG. 2 is a top plan view of the assembly of FIG. 1, showing a supporting wall in dot-dash lines.

FIG. 3 is a front elevational view of the swivel joint standing alone.

FIG. 4 is a longitudinal sectional view taken on line 4—4 of FIG. 3.

FIG. 5 is a side elevational view of the swivel joint.

FIG. 6 is an exploded perspective view on an enlarged scale of two swivel joint members employed in the fitting.

FIG. 7 is an exploded elevational view of the body of the fitting and one swivel joint member.

FIG. 8 is a longitudinal sectional view similar to FIG. 4 of the body of the fitting alone.

FIG. 9 is a cross-sectional view taken on line 9—9 of FIG. 4.

FIG. 10 is an elevational view on a reduced scale of the swivel joint members of FIG. 6 assembled together.

FIG. 11 is a perspective view of the swivel joint member of FIG. 7.

Referring to FIGS. 1–5, there is shown a swivel joint fitting 20 which includes a tapered, generally cylindrical body 22. This body has a circular cross section and a rounded top. A swivel joint member 24 is adapted to pivot angularly in a slot 26 formed in the rounded wider top of the body 22. Member 24 pivots on an axis perpendicular to the major longitudinal axis of the body 22. Another generally cylindrical swivel joint member 28 is mounted in the body angular movement with respect to the body on the longitudinal axis of the body.

The swivel joint member 24, as best shown in FIGS. 4 and 11, includes a cup-shaped generally circular portion 29 integrally joined with a nipple 30. The nipple is externally threaded at 32. The threading terminates at a rectangular boss 34. The nipple has a flange 36 disposed substantially tangential to the rim of the cup-shaped portion 29 and attached thereto by a partially cylindrical neck 40. A cut-out or recess 38 is formed in the rim of the cup-shaped portion at a point diametrically opposite the location of the neck 40. In the flat outer side of the cup-shaped portion 28 is formed a recess 42. A ball bearing 44 is removably disposed in this recess and is held there by a setscrew 46 inserted in the threaded bore 48 and boss 50 near the top of the body 22. The ball bearing 44 prevents setscrew 46 from loosening during pivotal movements of member 24 in body 22.

The swivel joint member 24 is capable of angular rotation on an axis perpendicular to the axis of body 22. This rotation is limited to substantially 180° by contact of the neck 40 or flange 36 with the outer bottom edge portions of slot 26 in the wall of the body 22.

A bore 52 is formed in the narrower end of body 22. In this cylindrical bore is secured a stationary camming member 54 in the form of a cylindrical frame. Member 54 is best shown in FIGS. 4, 6, 9 and 10. This member includes two ring portions 56 and 58. Ring 56 is an endless band integrally joined to one end of a peripheral bridge section or bar 60. Ring 58 is joined to the other end of the bar 60. Ring 58 extends circularly about 340° to provide a free end 62 spaced circumferentially from section 60. Rings 56 and 58 are thus axially spaced from each other by bar 60 and disposed in alignment. Member 54 is formed of a rigid material. Between rings 56 and 58 is a camming structure 65 in the form of a web which extends circumferentially from bar 60 between the rings 56 and 58. The web is cut away to provide a recess 66 which has its narrowest portion near bar 60 and its widest spacing about 180° away on the opposed inner edges of rings 56 and 58.

Swivel joint member 28 includes a cylindrical section 68 whose outer diameter is slightly less than the inner diameter of rings 56 and 58 so that section 68 can fit into member 54 and rotate angularly therein. On section 68 is a projection or key 70 which extends radially outward and normally fits into the space between the rings 56 and 58 as best shown in FIG. 10. Rotation of member 28 in member 54 is limited by engagement of the projection 70 in the progressively narrowing recess of web 65. By properly shaping the recess 66 in the web, rotation of member 28 can be limited between bar 60 and a predetermined point in recess 66 to approximately 180°. This angle of rotation is preferred as a maximum or limiting angle because the cable 74 carrying wires 76 shown in FIGS. 1, 2 and 4, which passes through bore 75 in member 28 is safely twisted to this extent.

Member 28 has a tapered collar portion 78 of enlarged diameter. This collar portion can be provided with flat undercuts or recesses 80 on opposite sides thereof. These recesses are adapted to anchor the member 28 in a support such as a wall 82 of a support as indicated in dotted lines in FIG. 2. Collar portion 78 is internally threaded, the threaded portion 79 being a continuation of the bore 75. The upper end of bore 75 flares outwardly at 77 to provide a smooth tapered passage for the electric wire cable 74. A boss 81 with a threaded bore 83 in which is removably inserted a setscrew 84 is provided on collar portion 78. This setscrew serves to secure the joint structure on a stationary post or pipe 85 which has a threaded end screwed into the threaded bore portion 79.

Body 22 of the joint structure has a passage 86 extending longitudinally therethrough from the slotted portion 26 to the bore 52. One wall 87 of this passage is smoothly curved in concave fashion to provide a smooth passageway for the cable 74. As shown in FIG. 4, the cable passes through a bore 33 in nipple 30, through the cavity in cup-shaped element 29, through passage 86 and bores 77, 75 and 79 in turn. The cable passes through pipe 85 as shown in FIGS. 1 and 2 and terminates at a suitable electrical power souce.

A curved ledge 88 is provided on wall 89 in passage 86 below slot 26 and spaced from wall 87. This ledge provides a base for seating and supporting the cup-shaped element 29. The curvature of the ledge permits the member 24 to be pivoted without interfering with movement of element 29.

A threaded bore 90 and boss 91 are provided at the lower end of body 22. This bore opens into bore 52. Setscrew 92 is removably inserted into the threaded bore. This screw will normally be inserted sufficiently to enter the space between rings 56 and 58 without binding on the cylindrical section 68 of member 28. The screw will prevent axial disengagement of member 28 from member 54 by obstructing the space between the free end 62 of ring 58 and the bar 60 so that projection 70 cannot pass through this space, once member 28 is assembled with member 54 as shown in FIGS. 4, 9 and 10.

The mode of assembly and operation of the swivel joint structure will now be readily apparent. Initially, member 54 will be seated and secured in bore 52 with the space between bar 60 and the end 62 of ring 58 aligned with bore 90. If desired, bore 90 can be located so that screw 92 will enter this space to prevent member 54 from rotation. If this is done, then bar 60 will serve as a stop element for projection 70 at one end of the angular rotational movement of member 28. It is preferred, however, that bore 90 be located between rings 56 and 58 just above the space between bar 60 and end 62 of ring 58 as shown in FIG. 4, so that the screw 92 will serve as a stop element for projection 70.

Member 28 will now be attached to pipe 85 and locked by screw 84. The cylindrical section of member 28 will now be inserted into the narrower end of body 22 with projection 70 passing through the space between bar 60 and ring end 62 until the projection is stopped by ring 56. The member 28 will now be turned slightly so that projection 70 enters the space between rings 56 and 58 to engage member 28 rotationally in member 54. Screw 92 will then be inserted in bore 90. If screw 92 is driven until its inner end bears on element 68, the member 28 will be prevented from rotation. This may be done after member 28 and body 22 are rotated with respect to each other so that the fixture 95 will be locked in a desired position.

The several parts of the swivel joint structure can be fabricated by casting or other well known mass production metal working processes. The several parts are economical and permit ready assembly and disassembly when required.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A swivel joint structure for a fixture, comprising a tapered body having a passage extending longitudinally therethrough, a rotatable member mounted in one end of said passage for rotation on a longitudinal axis of said body, means for limiting rotation of said member to a predetermined angle less than 360°, said member being adapted for attachment to a fixed support outside of the body, said rotatable member including a cylindrical section having a radially extending projection, and spaced ring elements disposed in said passage providing a channel for guiding rotational movement of said section with said projection disposed between said elements, and means at the other end of the passage for supporting a fixture.

2. A swivel joint structure for a fixture, comprising a tapered body having a passage extending longitudinally therethrough, a rotatable member mounted in one end of said passage for rotation on a longitudinal axis of said body, means for limiting rotation of said member to a predetermined angle less than 360°, said member being adapted for attachment to a fixed support outside of the body, said rotatable member including a cylindrical section having a radially extending projection, and spaced ring elements disposed in said passage providing a channel for guiding rotational movement of said section with said projection disposed between said elements, one of said ring elements having an open portion for passing said projection axially of the body, said ring elements carrying a web having a tapered recess adapted to engage said projection for limiting said rotational movement of the rotatable member, and means at the other end of the passage for supporting a fixture.

3. A swivel joint structure for a fixture, comprising a tapered body having a passage extending longitudinally therethrough, a rotatable member mounted in one end of said passage for rotation on a longitudinal axis of said body, means for limiting rotation of said member to a predetermined angle less than 360°, said member being adapted for attachment to a fixed support outside of the body, a cylindrical frame secured in said passage, said rotatable member including a cylindrical section disposed for rotation in said frame, said section having a radially extending projection, said frame having two ring elements integrally formed with a spacing bar defining a channel between said elements, said projection being disposed in said channel whereby said elements guide said rotatable member in rotational movement in the body, and means at the end of the passage for supporting a fixture.

4. A swivel joint structure for a fixture, comprising a tapered body having a passage extending longitudinally therethrough, a rotatable member mounted in one end of said passage for rotation on a longitudinal axis of said body, means for limiting rotation of said member to a predetermined angle less than 360°, said member being adapted for attachment to a fixed support outside of the body, said rotatable member including a cylindrical section having a radially extending projection, spaced ring elements disposed in said passage, a web formed between said ring elements, said web having a tapered recess providing a stop element for rotation of said rotatable member, one of said ring elements having an open portion for passing said projection axially of the body, and means for obstructing said open portion of said one ring element to prevent removal of said rotatable member from the body, and means at the other end of the passage for supporting a fixture.

5. A swivel joint structure for a fixture, comprising a tapered body having a passage extending longitudinally therethrough, a rotatable member mounted in one end of said passage for rotation on a longitudinal axis of said body, means for limiting rotation of said member to a predetermined angle less than 360°, said member being adapted for attachment to a fixed support outside of the body, said rotatable member including a cylindrical section having a radially extending projection, spaced ring elements disposed in said passage, a web formed between said ring elements, said web having a tapered recess providing a stop element for rotation of said rotatable member, one of said ring elements having an open portion for passing said projection axially of the body, and means for obstructing said open portion of said one ring element to prevent removal of said rotatable member from the body, the last-named means including a threaded bore laterally formed in said body and opening into said passage, and a screw removably inserted in said threaded bore and located to project into said open portion of said one ring element, and means at the other end of the passage for supporting a fixture.

References Cited in the file of this patent

UNITED STATES PATENTS

| | | |
|---|---|---|
| 2,617,619 | Versen | Nov. 11, 1952 |
| 2,632,660 | Krauthamer | Mar. 24, 1953 |
| 2,709,097 | Leary | May 24, 1955 |
| 2,826,440 | Robbay | Mar. 11, 1958 |
| 2,855,225 | Golden | Oct. 7, 1958 |